United States Patent [19]

Tanimoto et al.

[11] 4,185,169
[45] Jan. 22, 1980

[54] SYNTHETIC-SPEECH CALCULATORS

[75] Inventors: Akira Tanimoto, Kashihara; Sigeaki Masuzawa, Nara; Shinya Shibata, Nara; Shinzo Nishizaki, Nara, all of Japan

[73] Assignee: Sharp Kabushiki Kaisha, Japan

[21] Appl. No.: 874,950

[22] Filed: Feb. 3, 1978

[30] Foreign Application Priority Data

| Feb. 4, 1977 | [JP] | Japan | 52/13529[U] |
|---|---|---|---|
| Feb. 10, 1977 | [JP] | Japan | 52/13629 |
| Feb. 25, 1977 | [JP] | Japan | 52/20496 |
| Feb. 28, 1977 | [JP] | Japan | 52/22084 |
| Feb. 28, 1977 | [JP] | Japan | 52/22085 |

[51] Int. Cl.$^2$ .............................................. G06F 3/16
[52] U.S. Cl. .............................. 179/1 SM; 364/900; 364/710
[58] Field of Search ............ 179/1 SM; 364/200, 710, 364/900

[56] References Cited

U.S. PATENT DOCUMENTS 4,060,848 11/1977 Hyatt ............................. 179/1 SM

OTHER PUBLICATIONS

Article, "Talking Computers", Info Systems, Jul. 1972, pp. A and B.

Primary Examiner—Thomas W. Brown
Assistant Examiner—E. S. Kemeny
Attorney, Agent, or Firm—Birch, Stewart, Kolasch & Birch

[57] ABSTRACT

A synthetic speech calculator is provided which is capable of generating an audible sound signal which can be representative of keyed data, processed data, the contents of a memory or the contents of a counter. The sound signal can be suppressed under certain specific circumstances or made soft in intensity. The synthetic-speech calculator includes a keyboard consisting of digit keys and function keys, a desired number of registers for storing information entered by the depression of selected ones of the digit keys, a read-only-memory for storing a large number of digital codes as sound quantizing information, counter means for specifying the address of the memory so as to take a specific digital code out of the memory, a digital-to-analog converter for converting the specific digital code taken out of the memory into an audible sound signal, and a loud speaker driven by the audible sound signal and producing an audible sound. There are provided means responsive to combinations of at least two sequentially operated keys of the keyboard for modifying the output condition of the audible sound, for example, volume, speed, etc.

12 Claims, 13 Drawing Figures

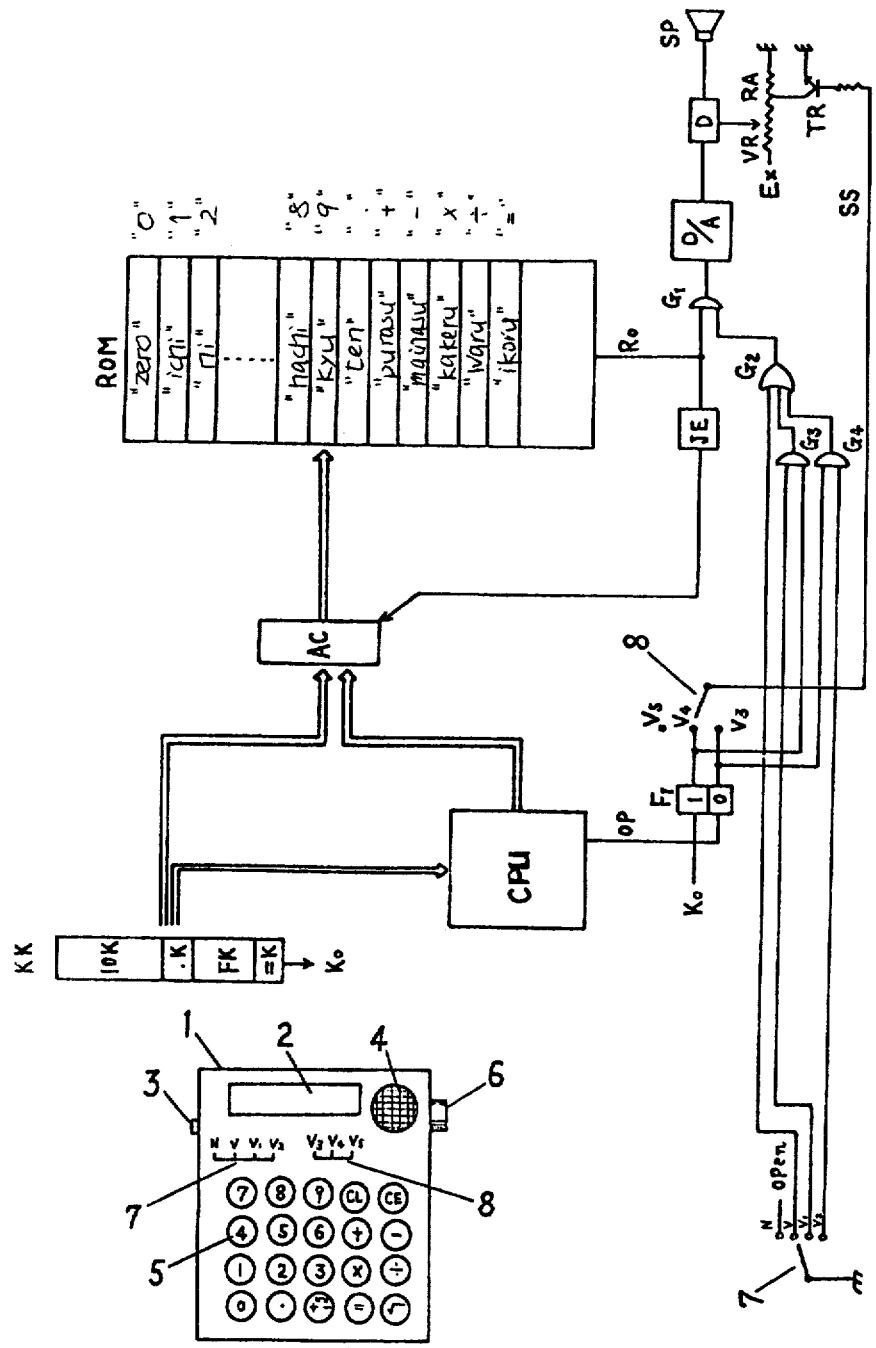

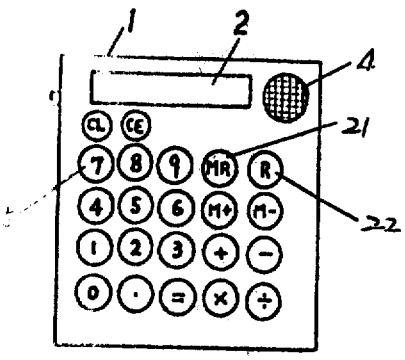
FIG.12
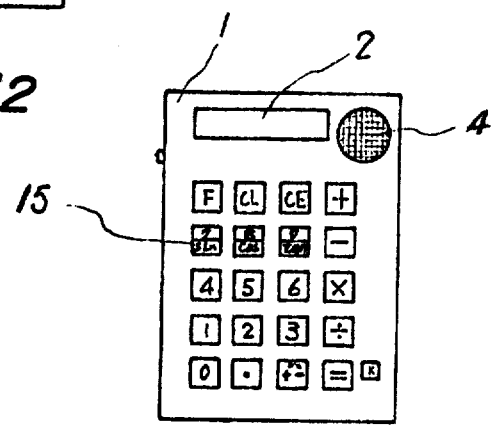
FIG.7
| | | | |
|---|---|---|---|
| (1) | [7/sin] [×] [3] [=] | ····· 7×3 | "nana" "kakeru" "san" "ikoru" |
| (2) | [7/sin] [×] [=] | ····· 7² | "nana" "kakeru" "ni" "jyo" |
| (3) | [7/sin] [×] [=] [=] | ····· 7³ | "nana" "kakeru" "ni" "jyo" "san" "jyo" |
| (4) | [3] [0] [F] [7/sin] | ····· sin 30° | "san" "zero" "sin" |
FIG.8

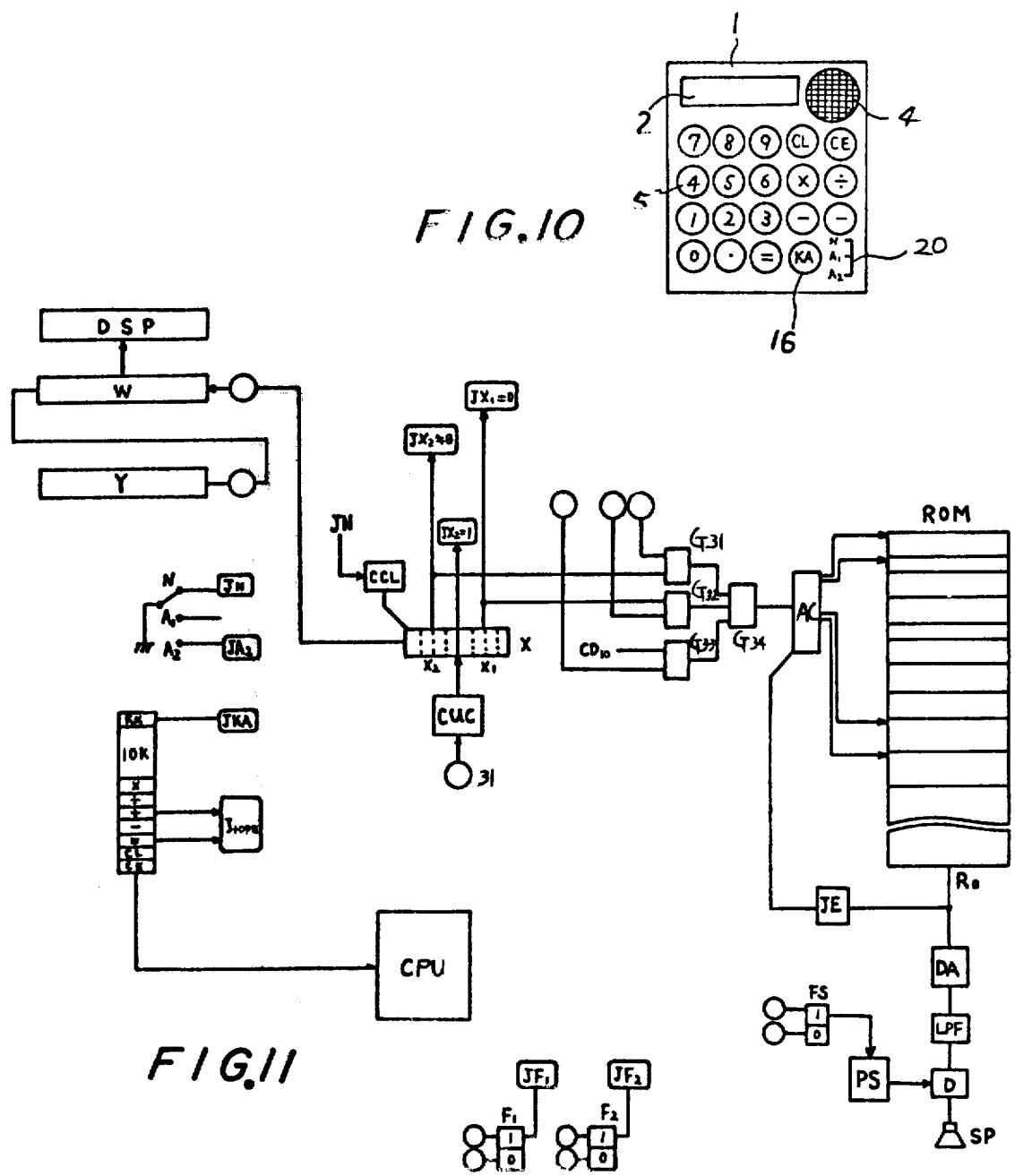

SYNTHETIC-SPEECH CALCULATORS

BACKGROUND OF THE INVENTION

The present invention relates to an improvement in a synthetic-speech calculator.

A synthetic-speech calculator is well known in the art of calculators. The prior art synthetic-speech calculator were capable of adjusting the volume of audible sounds through the use of a knob. Once the adjusting knob was set, the intensity of the audible sounds was constant in spite of the purpose of the audible sound. It is, however, desirable to the operator that audible sounds representative of calculation results be loudly produced while audible sounds concerning the entry of information from the keyboard be of lesser intensity. On the contrary, it is sometimes desirable that audible sounds be amplified only during the operation of keys in order to avoid errors in the entry of information while calculation results are visually provided. It may be more desirable to suppress the generation of audible sound in certain circumstances.

Meanwhile when producing audible sounds representative of the operation of a specific key, the operation of a next succeeding key should discontinue the generation of the previous audible sound. Accordingly, rapid operation of the keyboard causes a discountinuity in the production of audible sounds. If the operator is allowed to operate a specific key only after the delivery of audible sounds concerning the preceeding operated key, limitations on the speed of key operations would be unavoidable.

SUMMARY OF THE INVENTION

Therefore, it is an object of the present invention to provide an improvement in a synthetic-speech calculator capable of overcoming all the disadvantages noted above.

According to one of the major features of the present invention in a synthetic-speech calculator, there is provided means responsive to combinations of at least two sequentially operated keys of a keyboard of the calculator for the purpose of modifying the output condition of audible sounds. The audible sound can represent keyed information, processed results of keyed information, the contents of a memory on the contents of a counter. The intensity of the audible sound can be varied depending on the type of data it represents. Various selection means are provided for indicating what the audible sound signal shall represent and for indicating whcih audible sound shall be loud and which shall be soft in intensity. The calculator comprises a keyboard consisting of digit keys and function keys, a desired number of registers for storing information entered by the depression of selected ones of the digit keys, a read-only-memory for storing a large number of digital codes as sound quantizing information, counter means for specifying the address of the read-only-memory so as to take a specific digital code out of the read-only-memory, a digital-to-analog converter for converting the specific digital code taken out of the memory into an audible sound signal, and a loud speaker driven by the audible sound signal and producing an audible sound.

In one aspect of the present invention, a modifying means is provided for modifying the intensity of audible sounds depending upon the results of the performances of decision means which decides whether the calculator now stands in the key entry state, the operation start state or the operation result outputting state. For example, the calculator has selectively operable four operating modes: the first where no audible sounds are produced; the second where audiable sounds concerning both entered information and operation results are produced; the third where audible sounds concerning entered information are produced; and the last where audible sound concerning operation results are produced. The calculator, in addition, includes another mode selector thereby varying the intensity of the audible sounds from the loud speaker in accordance with the results from the decision means.

Some calculators may have double-function keys, for example, function keys $\boxed{7/\sin}$, $\boxed{8/\cos}$ and $\boxed{9/\tan}$ have the functions of instructing digits "7", "8" and "9" and the functions of instructing operations "sin," "cos," and "tan," respectively. In this case however there are provided additional means for changing the audible sounds representative of the specific functions of a particular multi-function key. In case where a calculator included item counter means for counting the number of the depressions of keys, for example, $\boxed{+}$ key and $\boxed{=}$ key, there are provided means for producing audible sounds representative of the number of depressions of specific keys in response to a combination of at least two operated keys. In addition, for a calculator having one or more memories there are provided means for producing audiable sounds representative of the contents of the memory or memories in response to combinations of at least two operated keys.

BRIEF DESCRIPTION OF THE DRAWINGS

Other objects and novel features of the present invention are set forth in the appended claims and mode of operation will best be understood from a consideration of the following detailed description of the embodiments taken in conjunction with the accompanying drawings, wherein;

FIG. 1 is a plan view of a synthetic-speech calculator in the first embodiment of the present invention;

FIG. 2 is a block diagram of construction of the synthetic-speech calculator as shown in FIG. 1;

FIGS. 7 through 9 are diagrams showing the third embodiment;

FIGS. 10 and 11 are diagram showing the fourth embodiment of the present invention; and FIGS. 12 and 13 are diagrams showing the fifth embodiment of the present invention.

DETAILED DESCRIPTION OF THE INVENTION

Figure 3:
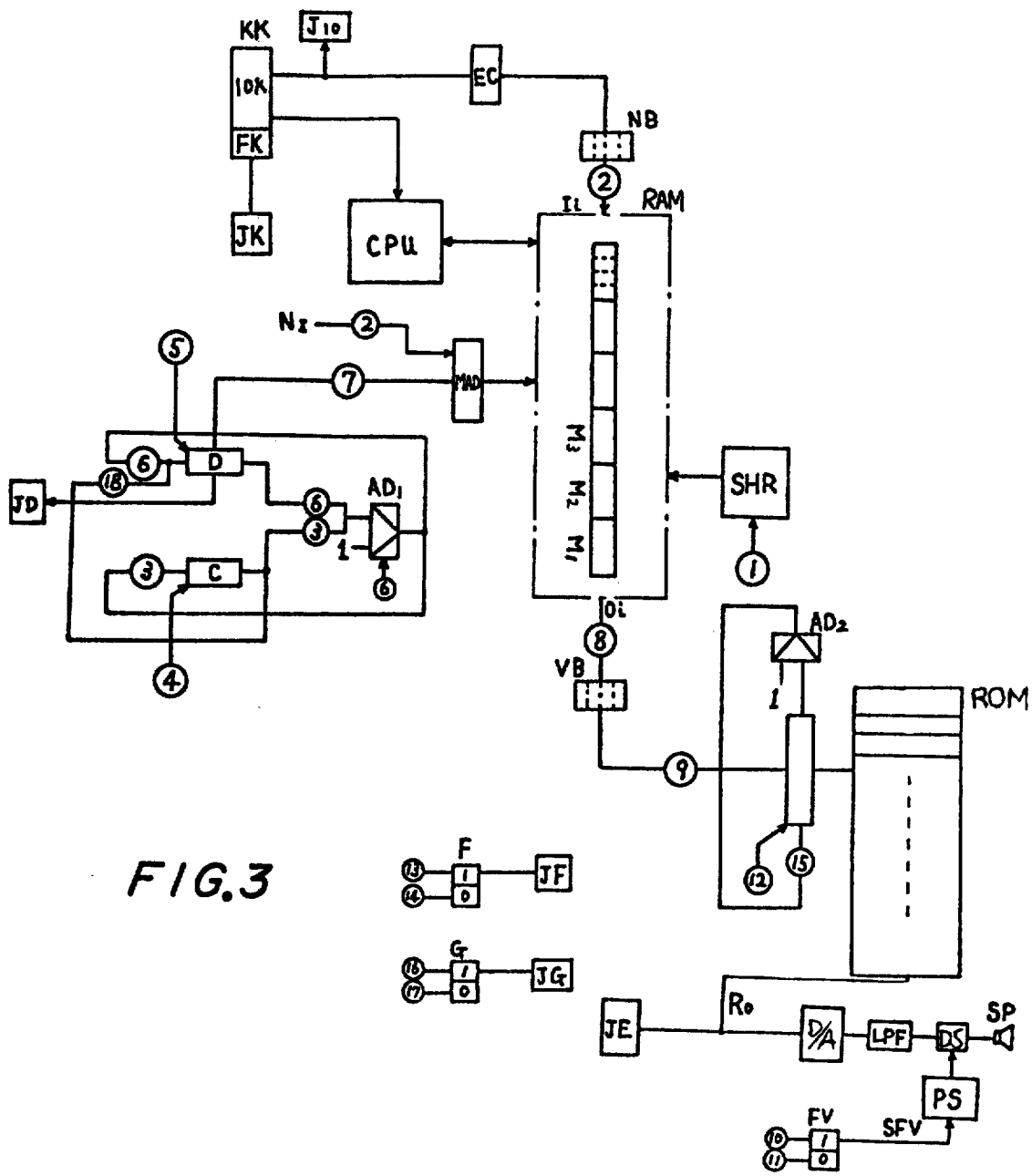
FIG. 3 is a block diagram of the second embodiment of the present invention.

Referring now to FIG. 1 of the drawings, there is illustrated a perspective view of a synthetic-speech calculator embodying the present invention in the first embodiment which includes a body 1, a display 2, a power switch 3, a loud speaker 4, a keyboard 5, a volume adjusting knob 6 and two mode switches 7 and 8. The speech synthesis technique is fully disclosed in many U.S. Pats., for example, U.S. Pat. No. 3,102,165, SPEECH SYNTHESIS SYSTEM to Genung L. Clapper and U.S. Pat. No. 3,398,241, DIGITAL STORAGE VOICE MESSAGE GENERATOR to Lyle H. Lee. The first switch 7 has selectively operable four modes N, V, V₁, and V₂ for controlling the generation and suppression of audible sounds: the first mode N where no audible sounds are produced; the second mode V where audible sounds are produced for both information entry and operation results; the third mode V₁ where audible sounds are produced for only information entry; and the fourth and last mode V₂ where audible sounds are produced for only operation results.

The second switch 8 has selectively operable three modes V₃, V₄, and V₅ for controlling the intensity of audible sounds; the first mode V₃ where audible sounds representative of keyed information are produced in a loud voice and ones representative of operation results are produced in a quiet voice; the second mode V₄ where audible sounds representative of keyed information are produced in a quiet voice and ones representative of operation results are produced in a loud voice; and the last mode V₅ (the so-called open state) where no changes are made in the intensity of audible sounds.

FIG. 2 illustrates a block diagram of the synthetic-speech calculator in the first embodiment of the present invention. A key board KK contains a family of digit keys 10K, a decimal point K, and a family of function keys FK (for example, an equal key ▭ ). The calculator 1 comprises a calculation circuit or central processor unit CPU, an address counter AC, a read-only-memory ROM for storing a large number of voice quantizing digital codes, an END code detector for detecting end codes laden at the end of each of the one-word quantizing digital codes, a digital-to-analog converter D/A, an amplifier D, a loud speaker SP (corresponding to 4 of FIG. 1), a volume knob VR, a transistor TR, AND gates G₁, G₃, and G₄, an OR gate G₂ and a flip flop F₁ which is settable in response to a signal indicative of operations continued or an operation start signal OP and resettable in response to a signal Ko from any one of the key switches KK.

The flip flop F₁ is held in the set state from the beginning of operations through the depression of a second key and held in the reset state during the entry of keyed information or while any key except keys instructing operations to start is being depressed. In other words, operation results are derived while the flip flip F₁ is in the set state.

If it is desired to produce audible sounds indicative of any depressed key switch KK, the address counter AC specifies the initial address of its corresponding region of the ROM. The address counter AC selects desired steps so that the outputs (digital signals) Ro from the ROM are applied to the AND gate G₁ together with control signals and converted into analog signal via the digital-to-analog converter D/A. These analog signals are supplied via the amplifier D to energize the loud speaker SP. As described above, the end codes are laden at the end of each of the one-word quantizing digital codes. The end code detector JE senses the end codes and then resets the address counter AC. The address counter AC is incremented unless it is reset.

The calculation circuit CPU effects desired operations upon receipt of inputs from the key switches KK and allows the ROM to produce the voice quantizing digital codes in a manner similar to the generation of audiable sounds indicative of keyed information. The amplifier is gain-adjustable. The transistor TR is connected to the fixed terminal RA of the volume variable resistor VR, which is under the control of a signal SS developed via the voice intensity controlling mode switch 8. When the signal SS turns on the transistor TR, a portion of the variable resistor VR is shunted, lowering the potential of the movable terminal of the variable resistor VR and thus the volume of audiable sounds. In summary, upon the arrival of the control signal SS ("high" level) the transistor TR is turned on to lower the volume of audiable sounds.

Assume now that the switch 8 is in the mode V₄. While producing audiable sounds indicative of operation results, the control signal SS is at a high level to turn on the transistor TR so as to reduce the voice volume. Otherwise, the control signal SS is at a low level so that the transistor TR is off to increase the voice volume. When the switch 8 is in the mode V₃, the reverse situation is experienced. Therefore, when the switch 8 is in the mode V₃, it is possible to produce audible sounds indicative of keyed information in a loud voice and ones indicative of operation results in a queit voice. The mode V₄, on the other hand, makes audible sounds of keyed information quiet and ones of operations results loud. As long as the mode switch 8 is positioned at the mode V₅, the transistor TR always is off and the control signal SS has no effects.

Meanwhile, when the switch 7 is in the mode N, the OR gate G₂ is disabled so that the AND gate G₁ is disabled not to transmit the outputs Ro from the ROM to the digital-to-analog converter D/A. While the AND gate G₁ decides whether audible sounds are produced, the output from the gate G₂ may control the power source of the amplifier D.

If the switch 7 is in the mode position V, the OR gate G₂ is enabled unconditionally to produce audible sounds. If the switch 7 is changed to the mode position V₁, the AND gate G₃ is on. Since the AND gate G₃ receive another input from the set output of the flip flop F₁, audible sounds of only keyed information are eventually produced. The switch 7 in the mode position V₂ turns on the gate G₄. Since the gate G₄ receives as another input the reset output of the flip flop F₁, audible sounds of only operation results are produced. In this manner, audible sounds are changed in intensity or inhibited in accordance with the internal states of the calculator.

FIGS. 3 through 6 show the second embodiment of the present invention which is capable of discontinuing the generation of audible sounds when manual depressions of keys are carried on very quickly. The components in the second embodiment of FIGS. 3 through 6 are given the same numbers as in FIGS. 1 and 2 wherever possible in order to point out the close relationship.

In the given example, key signals from the keyboard are introduced into a buffer NB via an encoder EC. A randon-access-memory RAM contains a given number of digit registers with an input terminal Ii, an output terminal Oi and an address counter MAD. This is depicted as having a six-digit capacity in FIG. 3. The keyed numerical information is transferred from the buffer NB to the RAM in accordance with the address specified by the counter MAD when a microinstruction ② is developed. A shift circuit SHR is adapted to shift the contents of the memory RAM and more specifically effect one-digit left shift thereon upon the development of the memory RAM.

A decision circuit FK of FIG. 3 determined whether any or all the keys of the keyboard has been actually operated, while a second decision circuit J₁₀ determined whether any of the digit keys has been actually operated.

A digit register C along with an adder/subtractor $AD_1$ counts the number of the digits that have been loaded into the RAM. The register C and the adder $AD_1$ form an adder circuit which effects addition of "1" to the contents of the register C upon the development of a microinstruction ③ whenever each digit of information is entered into the RAM.

Upon the receipt of a microinstruction ⑱ a register D receives the contents of the register C. A microinstruction ⑦ renders the RAM ready for sequential delivery of the contents of register C with aid of the address counter MAD. In addition, the register D and the adder/subtractor $AD_1$ form a subtractor circuit in response to a microinstruction ⑥. In other words, the contents of the register D are "1" subtracted each time information of the RAM is derived as an audible sound output. Microinstructions ④ and ⑤ are signals that reset the registers C and D.

A decision circuit JD determines whether the contents of the register D are zero's, and the affirmative answer from the decision circuit CD indicates that the delivery of all audible sound outputs from the RAM has been completed.

The voice quantizing digital codes are stored in preselected order in the ROM, for example, "ichi" "(one)," "ni(two)," "san (three)," "yon (four)," etc.

As stated above, the ROM has the address counter AC which is responsive to a microinstruction ⑨ developed when information via a buffer NB is entered thereto. The address counter AC specifies the initial address of the respective regions of the ROM. The counter AC and an adder $AD_2$ form an adder circuit in response to the development of a microinstruction ⑮. After specifying the initial address of the respective regions, the address counter AC keeps on addressing sequentially the ROM.

As in FIG. 2, the decision circuit JE senses the end codes and then discontinues the increment of the address counter AD. A microinstruction is a reset signal for the address counter AC. Similarly, the digital-to-analog converter D/A is connected to an output terminal of the ROM. A low-pass filter LPE, and a speaker driver DS are interposed between the digital-to-analog converter D/A and the loud speaker SP. A speaker control PS includes a flip flop FV to control a power supply to the loud speaker SP. The flip flop FV is set upon a microinstruction ⑩ and reset upon a microinstruction ⑪, the set output SFV being connected to the control PS.

A flip flop F is placed into the set state in response to a microinstruction ⑬ when information is entered into the RAM. A decision circuit JF senses the set state of the flip flip F. A microinstruction ⑭ resets the flip flop F.

A flip flop G is set in response to a microinstruction 16 while producing audible outputs, the set state thereof being sensed by a decision circuit JG. A microinstruction ⑰ resets the flip flop G.

Figure 4:
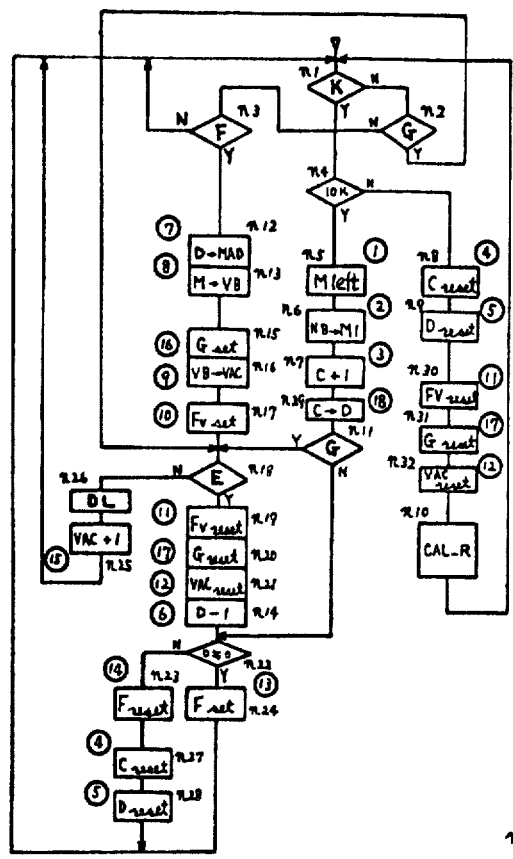
FIGS. 4 through 6 are flow charts showing operation of the second embodiment of FIG. 3.

In FIG. 4, events in a sequence of operation are labeled $n_1$ through $n_{29}$ and microinstructions are labeled ① through ⑱. The microinstruction ① through ⑱ correspond to those as shown in FIG. 3.

If no key is actually operated, the decision JK will not sense the depression of any keys in the step $n_1$. The step $n_2$ is reached where the decision JG does not sense the flip flop G in the set state (i. e., the audible output is being produced), thereby advancing to the next step $n_3$. At this moment the decision JF in the step $n_3$ does not sense the set state of the flip flop F (i. e., information is being entered into the RAM). The step $n_1$ is restored. In this manner, a loop of $n_1 \rightarrow n_2 \rightarrow n_3 \rightarrow n_1$ is recirculated when as no key is operated.

Thereafter, if any key is depressed, operation is skipped to the step $n_4$ where the decision $J_{10}$ determines whether that depressed key is a digit key or a function key. If the digit key is sensed, the key signal is encoded via the encoder EC and introduced into the buffer NB in the step $n_5$. Under the circumstances the microinstruction ① is developed to enable the shift circuit SHR to effect left shift of the RAM. Then, the step $n_6$ is reached.

The microinstruction 2 is developed so that information is transferred from the buffer NB to the input terminal Ii and the address counter MAD is given an address code $N_1$ to provide access to the first digit position $M_1$ of the register RAM, loading the information into $M_1$ of the RAM.

During the next succeeding step $n_7$ the microinstruction ③ is developed so that the adder circuit is established between the register C and the adder/subtractor $AD_1$ to add "1" to the contents of the register C. In this case the register C is incremented from "0" to "1". The step $n_{29}$ is then reached. Upon the development of the microinstruction ⑱ the contents of the register C are transferred to the register D. At this time the register C keeps on storing information.

In the step $n_{11}$ the decision JG never senses the set state (i.e., the audiable output are being produced) of the flip flop G. The step $n_{22}$ becomes operative where the decision JD senses that the register D does not assume "0" because the register D has already been laden with a "1".

Thereafter, in the step $n_{24}$ the microinstruction ⑬ is developed to set the flip flop F, reverting to the step $n_1$. The decision JE senses the flip flop F in the set state.

If no key is depressed after returning to the step $n_1$, the step $n_2$ is reached where the decision JG does not sense the set state of the flip flop G. In the step $n_3$ the decision JE determines that the flip flop F is in the set state, advancing to the step $n_{12}$.

In the step $n_{12}$ the microinstruction ⑦ is developed so that the address counter MAD is set in accordance with the contents of the register D, firstly specifying the first digit position of the RAM. In other words, "1" stored in the register D menas "1" sotred in the address counter MAD, specifying the address of the first digit position of the RAM. Then, the step $n_{13}$ follows where information stored in the first digit position of the RAM is shifted to the buffer VB in response to the microinstruction ⑧.

Afterward, in the step $n_{15}$ the microinstruction ⑯ is developed to set the flip flop G. At this time the decision JG senses the flip flop G in the set state. The step $n_{16}$ follows where the contents of the buffer VB specify the address counter via the microinstruction 9. The address counter AC provides access to the initial address of the respective regions of the ROM corresponding to information stored in the RAM.

Figure 5:
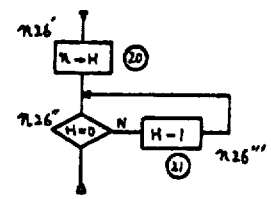
Figure 6:
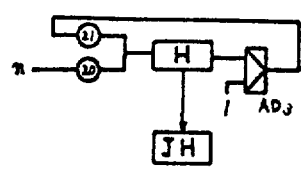

The microinstruction 10 is developed to set the flip flop FV in the step $n_{17}$. The control PS starts supplying the speaker driver SD with power in response to the set output SFV of the flip flop FV. In the next step $n_{18}$ the decision JE does not sense the end code because the address counter AC has just specified the initial address of the respective regions, followed by the step $n_{26}$. A delay action which will be described with respect to FIGS. 5 and 6, is carried through between the steps $n_{26}$ and $n_{25}$. In the following step $n_{25}$, the microinstruction 15 is developed to permit the adder $AD_2$ to add "1" to the contents of the address counter AD, specifying the next succeeding address within that region. In the event that no key is depressed after reterning to the step $n_1$ again, the step $n_2$ is carried through where the decision JG senses the set date of the flip flop G, followed by the step $n_{18}$. The continued step $n_{26} \rightarrow n_{25} \rightarrow n_1$ are effected in advance of the appearance of the end code at the decision JE. Therefore, circulation of the steps $n_1 \rightarrow n_2 \rightarrow n_{18} \rightarrow n_{26} \rightarrow n_{25} \rightarrow n_1$ provides access to the overall region.

The digital codes are taken sequentially out of the ROM, by addressing of the address counter AD, starting with its initial address. These digital codes are converted via the digital-to-analog converter D/A, producing audible sounds via the low-pass filter LPF, the speaker driver SD and the loud speaker SP.

Since in this case the address counter AC achieves the addressing in accordance with a different digit of the RAM, the region "ichi" ("one" in English) of the ROM is allocated when the addressing is by numeral information "1" and the one "ni" ("two" in English) is allocated when the addressing is by numeral information "2". If the end code is derived from the regions, the decision JE is active moving forward to the step $n_{19}$.

In the step $n_{19}$ the microinstruction 11 is developed to force the flip flop FV into the reset state, ceasing a power supply to the driver SD. The step $n_{20}$ is effected to develop the microinstruction 17 and reset the flip flop G. The step $n_{21}$ follows where the address counter AD is reset upon the development of the microinstruction 12. Subsequently, the adder/subtractor $AD_1$ serves to subtract "1" form the contents of the register D upon the microinstruction developed. As a results, the register D bears "0".

After that, the decision JD in the step $n_{22}$ senses "0" in the register D (determining that the audible sound corresponding to the digits keyed via the keyboard have all been completed), moving toward the step $n_{23}$. Upon the receipt of the microinstruction 14 the flip flop F is reset, followed by the step $n_{27}$ where the register C is reset by the microinstruction. In the step $n_{28}$ the register D is reset by the microinstruction 5, restoring to the step $n_1$.

The above described "1" subtraction is necessarily required in the step $n_{14}$ after completing the access to the overall region. The decision D in the step $n_{22}$ determined whether audible outputs for all the keyed digits have been produced, This is accomplished by the detection of the register D in the "0" state.

A loop $n_1 \rightarrow n_2 \rightarrow n_3 \rightarrow n_1$ is circulated if no key is operated after returning back to the step $n_1$. When the second depression of a different or same key is viewed, the procedure is repeated in the same manner as for the previous key depression.

Since in this case the register RAM is left shifted in the step $n_5$, numeral information by the first key depression is loaded into the second least significant digit $M_2$ and numeral information by the second key depression is loaded into the least significant digit $M_1$. While the addressing of the address counter AD is effected by "1" in the register D in the step $n_{12}$, the least significant digit $M_1$ of the RAM specifically sets the address counter AD during the steps $n_{13}$ through $n_{16}$, specifying the corresponding region of the ROM to produce audible sounds.

Attention is directed to FIGS. 5 and 6 of the drawings showing the delay action in the step $n_{26}$. The detailed step $n_{26}$ consists of three steps $n_{26}$, $n_{26}'$ and $n_{26}'''$: the first step $n_{26}$, whereby a specific constant n is loaded into a register H; the second step $n_{26}''$ whereby "0" in the register H is determined; and the last step $n_{26}'''$ whereby a subtractor $AD_3$ is effective on the register H. "0" in the register H sensed leads to the step $n_{25}$. In other words, the microinstruction ⑳ is developed to lead the specific constant n into the register H in the first step $n_{26}'$. A decision JH in the step $n_{26}''$ determined whether the regisger H bears 0's. The register H does not bear S's in the initial state, resulting in that the microinstruction ㉑ is developed to effect "1" substraction in the step $n_{26}'''$. Then, the step $n_{26}''$ is returned to the 0's decision. In this manner, a loop $n_{26}'' \rightarrow n_{26}''' \rightarrow n_{26}''$ is repeated until the register H comes to the "0" state.

Assume that any function key is operated under these circumstances. The procedure is started with the step $n_1$ and moved toward the step $n_4$. The decision $J_{10}$ senses no digit key, followed by the step $n_8$ where the microinstruction ④ is developed to reset the register C. Then, the step $n_9$ is carried through to develop the microinstruction ⑤ and reset the register D, moving forward the step 31. The flip flop FV is reset in the step $n_{30}$ and the flip flop G is reset in the step $n_{31}$ and the address counter AD is reset either in the step $n_{32}$. Subsequently, a control routine is effected for the function key depressed in the step $n_{10}$, restoring to the step $n_1$. For this reason, when a specific function key is operated, the delivery of audible sounds is forcedly inhibited. The second key is depressed quickly on the way to produce audible sounds indicative of the first depressed key. The depression of the first key allows the advancement of a sequence of the steps $n_1 \rightarrow n_4 \rightarrow n_5 \rightarrow n_6 \rightarrow n_7 \rightarrow n_{29} \rightarrow n_{11} \rightarrow$    $n_{22} \rightarrow n_{24} \rightarrow n_1 \rightarrow n_2 \rightarrow n_3 \rightarrow n_{12} \rightarrow n_{13} \rightarrow n_{15} \rightarrow n_{16} \rightarrow$ $n_{17} \rightarrow n_{18} \rightarrow n_{24} \rightarrow n_{25} \rightarrow n_1$, thereby providing sequentially the designated region of the ROM.

If the second key is depressed while producing audible sounds, the steps are changed from a loop $n_1 \rightarrow n_2 \rightarrow n_{18} \rightarrow n_{26} \rightarrow n_{25} \rightarrow n_1$ to a loop of $n_1 \rightarrow n_4 \rightarrow n_5 \rightarrow n_6 \rightarrow n_7 \rightarrow n_{29} \rightarrow n_{11}$. The decision JG is the step $n_{11}$ senses the flip flop G in the set state to establish a loop the steps $n_{26} \rightarrow n_{25} \rightarrow n_1 \rightarrow (n_1 \rightarrow n_2 \rightarrow n_{18} \rightarrow n_{26} \rightarrow n_{25} \rightarrow n_1)$.

In summary, in the event that the second or third depression is carried through while producing audible sounds indicative of the first depressee key, that audible sound are discontinued so that information indicative of the sound or third key is first loaded into the RAM and the audible sounds are produced again.

Figure 9:
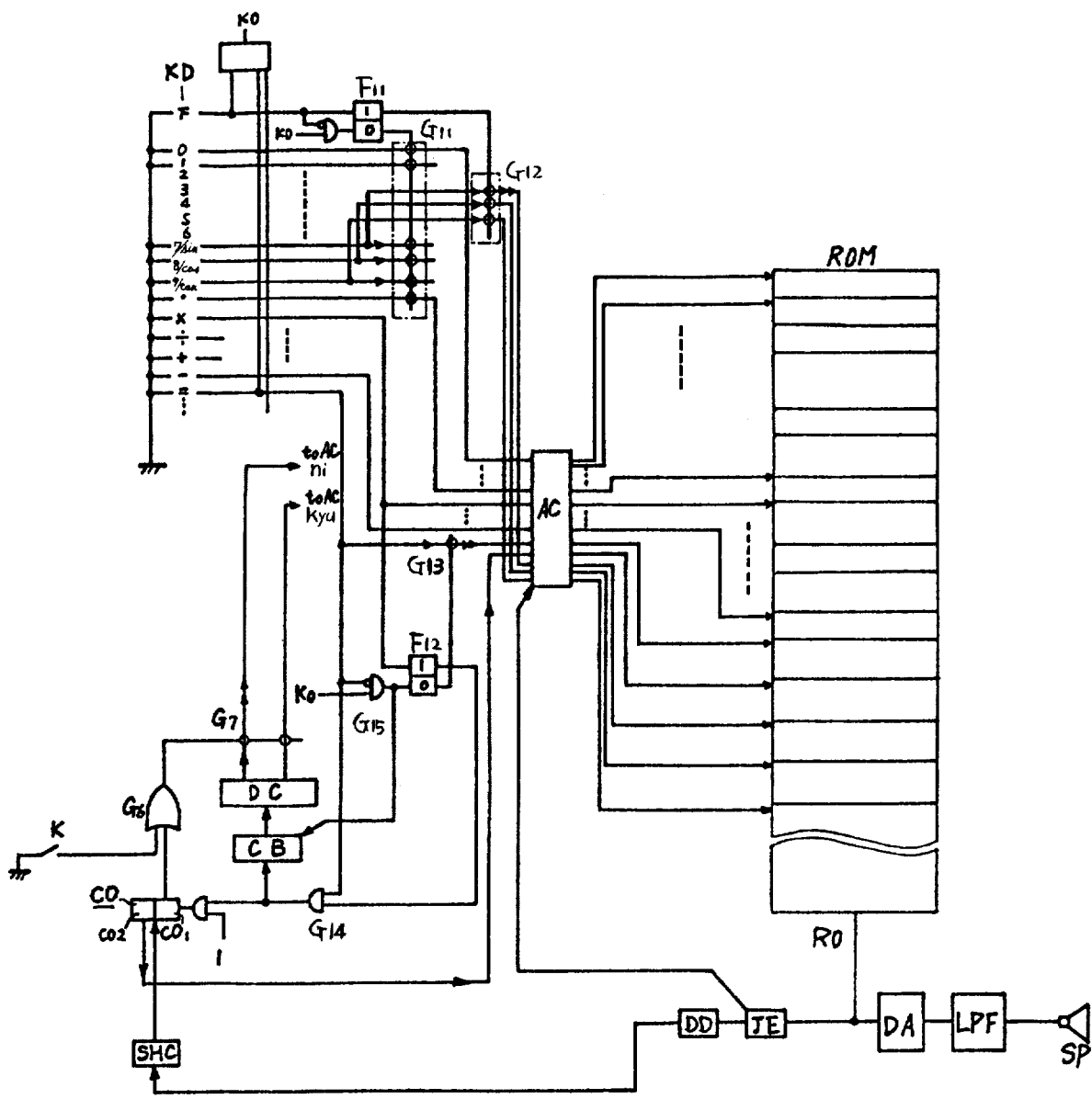

Because in this case a loop of the steps $n_{18} \rightarrow n_{26} \rightarrow n_{25}$ is not passed even upon the depression of the second or third key, the address counter AC is not incremented and keeps on specifying the same address. Under the circumstances the delay action is intervened to avoid distortions in the waveform of audible sounds, ensuring normal audiable sounds. FIGS. 7 through 9 show the third embodiment where the present invention is applied to calculators having multi-function keys. The components in the embodiment in FIGS. 7 through 9 are given the same number as in FIGS. 1 through 6 wherever possible in order element 15 in FIG. 7 designates a two-function key, for example 7/sin, 8/cos and 9/tan which is different from the normal single-function keys. In other words, the two-function keys have the functions of introducing digits "7", "8", and "9" and the functions of introducing operations "sin", "cos," and "tan." A function selection key F is provided for function selection of the two-function keys. When any of the multi-function keys is depressed in the clear or ready state or calculation end state of the calculator, any of the digits "7" through "9" is specified. After the depression of the function selection key F, the multi-function keys can specify any of the operations "sin" through "tan". A sound reproduction key K is provided.

A flip flop $F_{11}$ of FIG. 9 senses the depression of the function selection key F and is placed into the set state in response to depression of the selection key F and into the reset state in response to depression of all the remaining keys. A key output Ko is derived whenever any of the keys is depressed.

Provided that the multi-function key 7/sin is depressed under the condition that the selection key F has not been operated and the flip flop $F_{11}$ is in the reset state, a family of logic gates $G_{11}$ will be active to load the address counter AC with the initial address of the region of the ROM containing digital codes "nana" (in English seven). The same is applicable to the other multi-function keys 8/cos and 9/tan. By sepcifying the region "nana" of the ROM, audible sound "nana" is produced via the speaker SP driven by Ro. The decision JE senses the end code positioned at the end of the sound quantizing digital codes. When the end code, is detected the address counter AC is reset to suppress the generation of audible sounds. It will be noted that the address counter AC is not self running as long as it is held in the reset state.

If the multi-function key 7/sin is depressed after the depression of the function selection key F as viewed from FIG. 8, line (4), $F_{11}$ is set to turn on a gate $G_{12}$ so that the output from the multi-function key 7/sin specifies the initial address of the region of the ROM containing the sound quantizing digital codes "sain" (sin in English). Therefore, audible sound "sain" is produced in response to the depresseion of the multi-function key 7/sin after the depression of the selection key F forces the $F_{11}$ into the reset state.

The difference between the normal single-function keys and the two-function keys should be recognized as in the case of power calculations of FIG. 8, lines (2) and (3). A flip flop $F_{12}$ of FIG. 9 determines whether the ⊟ key is depressed after the depression of the X key. The depression of the X key specifies the initial address of the region of the ROM containing the quantized sound "kakeru" (multiply in English) via AC and placed the flip flop $F_{12}$ into the set state. While $F_{12}$ is reset upon the depression of any keys rather than the ⊟ key following the X key, the ⊟ key when depressed sets the flip flop $F_{12}$.

When the $F_{12}$ key is in the reset state, the depression of the ⊟ key makes a gate $G_{13}$ operative to specify the region of the ROM containing sounds "ikoru" (equal in English). The depression of the ⊟ key under the set state of the $F_{12}$ turns on a gate $G_{14}$ to load the first bit $CO_1$ of a counter CO with "1" and increment one step a binary counter CB. The binary counter CB will be reset (for example, "0000") upon by a gate $G_{15}$ the depression of any other keys than the ⊟ key.

The binary counter CB bears "0001" is response to the depression of the keys X and ⊟, which instructs square calculations. In decoding CB via a decoder DC, the output of the decoder DC is connected to AC in a manner to specify the initial address of the region of the ROM containing audible sounds "ni" ("two" in English). In this manner, the gate $G_{14}$ is turned on in response to the ⊟ key of the depressions X and ⊟ with the result that $CO_1=1$ and CB=0001.

A gate $G_{17}$ is turned on so that the output of the decoder DC specified the region of the ROM containing the voice quantizing digital codes "ni" to produced audiable sounds "ni". Then, JE=1 upon the appearance of the end code to reset the address counter AC. In order to produce audible sounds "jyo" (square in English), a delay circuit DD is provided to lodge an appropriate pause between the audible sounds "ni" and "jyo". The output of the JE is delayed via the delay circuit D and entered into a shift control SHC for the counter CO. The result is that "1" in the $CO_1$ is shifted to the second bit with $CO_2=1$. The relationship $CO_2=1$ permits the address counter AC to specify the initial address of the region "jyo." That is, the depression of the keys X and ⊟ produces the audible sounds "ni" and "jyo."

Further depression of the ⊟ key (FIG. 8, line (3)) enables the gate $G_{14}$ so that CB is incremented to "0010" and the counter CO bears "01". Therefore, the output of the decoder DC corresponds to "0010" in CB. A signal is applied to AC via the gate $G_{17}$, specifying the initial address of the region of the ROM containing the digital codes "san" (three in English). After producing sounds "san," the sounds "jyo" is produced.

FIGS. 10 and 11 show the fourth embodiment which produces audible sounds indicative of the contents of an item counter. Generally, the primary object of an item counter is to count the number of depressions of a specific key, for example, ⊞ key or+key.

A mode selector 20 has three selectively operable modes N, $A_1$ and $A_2$: the first mode N where the item counting is not required; the second mode $A_1$ where the item counter is carried through while the counts of the counter is provided visually but not acoustically; and the third mode $A_2$ where audible sounds indicative of the contents of the item counter are produced in accordance with the present invention. A keyboard includes a count output key 16.

Figure 13:
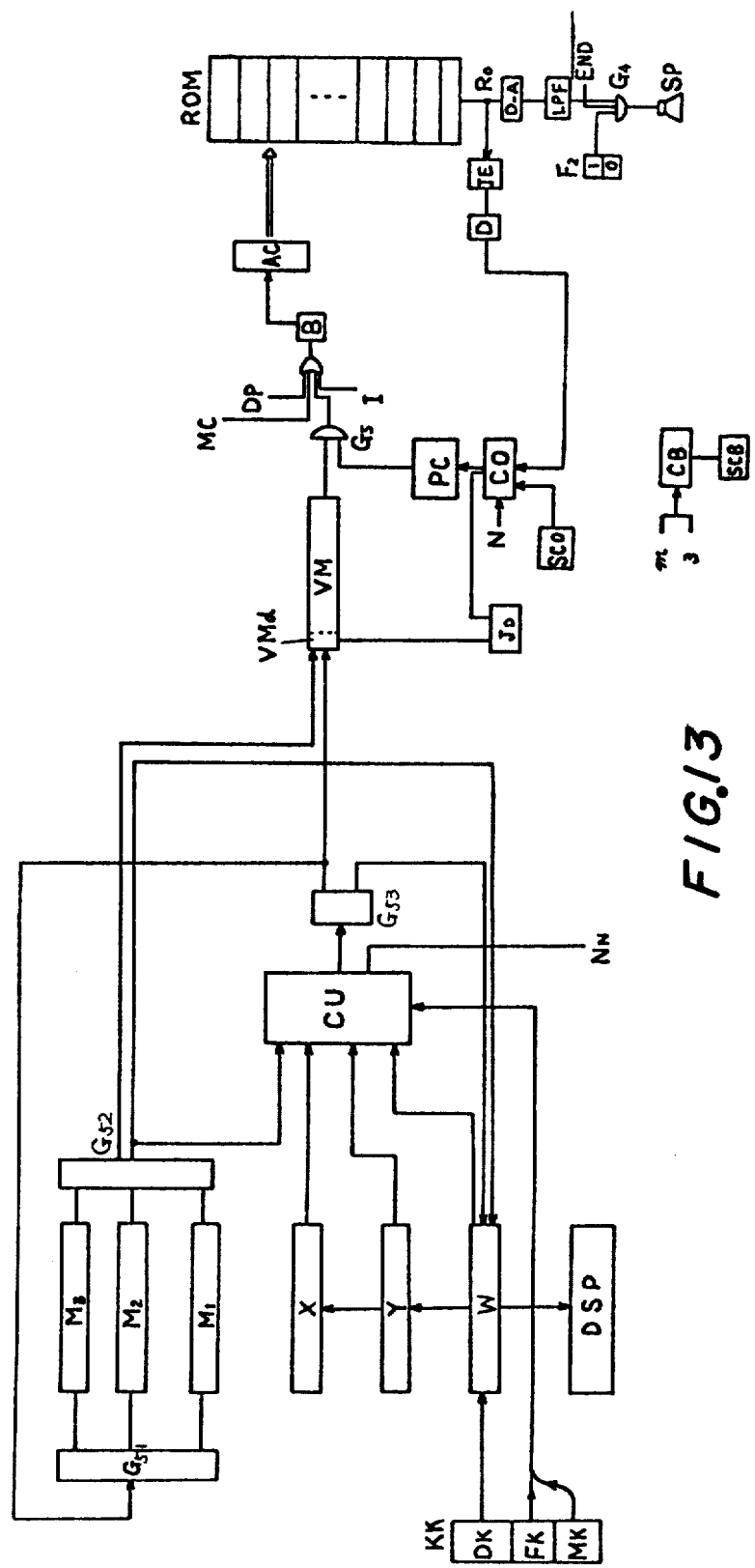

In FIG. 11, numerical registers W and Y contained within the RAM store information processed by the processor CPU, the contents of one of the registers W being automatically displayed on a display DSP. A register X consists of two digit positions $X_1$ and $X_2$ and is able to store the counts of 1 through 99. A circuit labeled CUC Is provided to increment one step of the contents of the register X in response to the development of a microinstruction ㉛. A clear circuit CCL is provided to clear up the register X and whenever the switch 20 is in the mode N the register X is cleared. AND gates $G_{31}$–$G_{33}$ and an OR gate $G_{24}$ are included. A signal $CD_{10}$ permits the address counter AC to specify the initial address of the region of the ROM containing sounds "Jyu" (ten in English). FIGS. 12 and 13 show the fifth embodiment wherein the present invention is applied to a memory calculator. The memory provided calculator of FIG. 12 has a memory recall key 21 and a specific key 22. In FIG. 13 there are at least three memories $M_1$, $M_2$ and $M_3$. Gates $G_{51}$ and $G_{52}$ are provided for selection of any one of the memories $M_1$, $M_2$ and $M_3$. A gate $G_{53}$ is provided for directing operation results toward the display register W or a selected one of the memories $M_1$, $M_2$ and $M_3$. A buff VM is effective in producing audible sounds indicative of the contents of any one of the memories $M_1$, $M_2$, $M_3$, and stores at the most significant digit position thereof coded decimal point information VMd. SCO denotes a circuit for substracting "1" from the contents of the counter CO. A coincidence circuit JD determines whether the contents of the counter CO is, equal to the decimal point information VMD in the register VM. When the counter CO shows "1", the least significant digit information of the VM register is entered into the buffer register BC. A timing signal generator PC provides information, the timing signals being applied to an AND gate $G_{55}$ together with the output of the VM register. Audible sounds indicative of the contents of a particular one of the momeries $M_1$, $M_2$ and $M_3$ are produced in the substantially same manner as in the foregoing embodiments.

As used in the foregoing description, "key in a keyboard" is intended to mean not only any keys contained within a keyboard but also any mode selectors generally disposed apart from the keyboard for purposes of the present invention.

While only certain embodiments of the present invention have been described, it will be apparent to those skilled in the art that various changes and modifications may be made therein without departing from the spirit and scope of the invention as claimed.

We claim:

1. A synthetic-speech calculator having a keyboard comprising:
   a memory means for storing a plurality of sound related digital codes;
   means responsive to actuations of said keys on said keyboard for selecting previously stored specific sound related digital codes from said memory means thereby generating audible sound signals;
   means responsive to the sequential actuation of at least two keys for generating audible sounds characteristic of said at least two keys in the sequence of the actuation of said keys;
   means for discontinuing the generation of the first characteristic audible sound of said sequence when a subsequent key actuation in said sequence occurs during the generation of said first characteristic audible sound; and
   means for resuming the generation of said first characteristic audible sound of said sequence followed by the audible sounds characteristic of the subsequently actuated keys after said subsequent key operations are completed.

2. A synthetic speech calculator having a keyboard comprising:
   a memory means for storing sound related digital codes;
   counter means responsive to actuations of a specific key on said keyboard for counting the number of actuations of said specific key on said keyboard;
   information means responsive to the contents of said counter means for providing to the operator of said calculator information indicative of the contents of said counter means, said information means comprising mode selector switch means having at least two actuation positions;
   means responsive to one of said at least two actuation positions of said mode selector switch means for selecting a specific sound related digital code from said memory means and for generating an audible sound signal indicative of the contents of said counter means and represented by its respective sound related digital code; and
   means responsive to said audible sound signal for generating an audible sound in accordance with said audible sound signal, the second of said at least two actuation positions of said mode selector switch means preventing the generation of said audible sound, the second of said at least two actuation positions enabling a visual display representing the contents of said counter means.

3. A synthetic-speech calculator having a keyboard with a plurality of keys for entering keyed information comprising:
   memory means for storing a plurality of sound related digital codes, said digital codes corresponding to audible synthetic-speech sounds with predetermined characteristics;
   processing means responsive to said keyed information for generating a calculation result;
   address means for retrieving previously stored selected ones of said digital codes stored in said memory means in response to the actuation of selected keys on said keyboard or calculation results generated by said processing means;
   sound generating means responsive to the digital codes retrieved by said address means for generating audible synthetic-speech sounds corresponding to the retrieved digital codes;
   attenuating means for changing the generated sounds from a first to a second intensity level;
   first mode selector means operatively coupled to said attenuating means for correlating a specific one of said first and second intensity levels to the actuation of a selected key or the generation of a calculation result, respectively; and
   second mode selector means operatively coupled to said sound generation means for selectively enabling or disabling said sound generation means with respect to sounds corresponding to the actuation of a selected key or said generated calculation results;
   whereby the actuation of selected keys and calculation results are distinguishable by the intensity levels of the synthetic-speech sounds corresponding thereto.

4. A synthetic-speech calculator according to claim 3 further comprising:
   said keyboard having at least one multi-function key, said multi-function key being capable of entering a specific digit and a specific function;
   function select key means on said calculator for selecting the specific function portion of said multi-function key for display and sound producing purposes; and
   means responsive to actuation of said function select key means and said multi-function key on said keyboard for producing audible sounds based on a selected sound related digital code in said memory means, said sound being indicative of said selected specific function of said multi-function key.

5. The synthetic-speech calculator as recited in claim 4 further comprising means for lodging a pause between two audible sounds.

6. A synthetic-speech calculator in accordance with claim 3 further comprising:
   means responsive to actuation of said keys on said keyboard for suppressing the generation of said audible sound when the rate of data entry of keyed information into said electronic calculator rises above a specific predetermined level.

7. A synthetic-speech calculator in accordance with claim 3 wherein said keys on said calculator comprise multi-function keys, said multi-function keys being capable of entering digit information or function information;
- selection means selectable on said housing for indicating if said digit or said function information is being entered; and
- sound generating means responsive to said selection means for generating an audible sound indicative of said function information associated with said multi-function keys, said sound generating means being capable of generating an audible sound indicative of said digit information.

8. A synthetic-speech calculator in accordance with claim 3 further comprising:
- counter means responsive to actuation of said keys on said keyboard for counting the number of depressions of a specific key on said calculator; and
- means responsive to said count in said counter means for generating an audible sound indicative of a predetermined number of depressions of said specific key on said calculator.

9. A synthetic-speech calculator in accordance with claim 3 further comprising:
- first memory means for storing said calculation result; and
- means responsive to the contents of said first memory means for generating an audible sound, said audible sound being indicative of the contents of said first memory means.

10. A synthetic-speech calculator in accordance with claim 6 wherein said keys on said calculator comprise multi-function keys, said multi-function keys being capable of entering digit information or function information;
- selection means selectable on said housing for indicating if said digit or said function information is being entered; and
- generating means responsive to said selection means for generating an audible sound indicative of said function information associated with said multi-function keys, said generating means being capable of generating an audible sound indicative of said digit information.

11. A synthetic-speech calculator in accordance with claim 10 further comprising:
- counter means responsive to actuation of said keys on said keyboard for counting the number of depressions of a specific key on said calculator; and
- means responsive to said count in said counter means for generating an audible sound indicative of a predetermined number of depressions of said specific key on said calculator.

12. A synthetic-speech calculator in accordance with claim 11 further comprising:
- first memory means for storing said calculation result; and
- means responsive to the contents of said first memory means for generating an audible sound, said audible sound being indicative of the contents of said first memory means.

* * * * *